(12) United States Patent
Lee

(10) Patent No.: US 9,407,908 B2
(45) Date of Patent: Aug. 2, 2016

(54) IMAGE DISPLAY APPARATUS AND METHOD FOR OPERATING THE SAME

(75) Inventor: Yong Uk Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 688 days.

(21) Appl. No.: 13/391,204

(22) PCT Filed: Aug. 20, 2010

(86) PCT No.: PCT/KR2010/005548
§ 371 (c)(1),
(2), (4) Date: Jun. 7, 2012

(87) PCT Pub. No.: WO2011/021894
PCT Pub. Date: Feb. 24, 2011

(65) Prior Publication Data
US 2012/0242808 A1    Sep. 27, 2012

Related U.S. Application Data

(60) Provisional application No. 61/235,369, filed on Aug. 20, 2009.

(51) Int. Cl.
*H04N 13/04* (2006.01)
*H04N 13/00* (2006.01)

(52) U.S. Cl.
CPC ....... *H04N 13/0497* (2013.01); *H04N 13/0454* (2013.01); *H04N 13/0456* (2013.01); *H04N 13/004* (2013.01); *H04N 13/0055* (2013.01); *H04N 13/0402* (2013.01); *H04N 13/0429* (2013.01); *H04N 13/0438* (2013.01)

(58) Field of Classification Search
CPC .................................................. H04N 13/0497

USPC ............................................................ 348/51
See application file for complete search history.

(56) References Cited

U.S. PATENT DOCUMENTS

| | | | |
|---|---|---|---|
| 6,137,450 A | 10/2000 | Bhattacharyya et al. | |
| 6,137,456 A * | 10/2000 | Bhagavatula | H04N 13/0404 345/103 |
| 6,157,424 A * | 12/2000 | Eichenlaub | G02B 27/2214 348/E13.022 |
| 6,404,442 B1 * | 6/2002 | Hilpert, Jr. | G06F 3/167 715/700 |
| 7,349,568 B2 * | 3/2008 | Takemoto | G06F 21/31 345/419 |
| 2007/0283247 A1 | 12/2007 | Brenneman et al. | |
| 2008/0034316 A1 | 2/2008 | Thoresson | |
| 2010/0067873 A1 * | 3/2010 | Sasaki | G11B 27/105 386/241 |
| 2011/0157169 A1 * | 6/2011 | Bennett | G06F 3/14 345/419 |

OTHER PUBLICATIONS

"Jasc Paint Shop Pro", Aug. 1, 2001, pp. 1-2, XP007922445.

* cited by examiner

*Primary Examiner* — Chikaodili E Anyikire
(74) *Attorney, Agent, or Firm* — Birch, Stewart, Kolasch & Birch, LLP

(57) ABSTRACT

An image display apparatus and a method for operating the same are disclosed. The method for operating an image display apparatus includes receiving an image, separating the image into at least one of a two-dimensional (2D) image area or a three-dimensional (3D) image area, and displaying the at least one of the 2D or 3D image areas along with an area control object for changing a position or size of the 2D or 3D image area, on a display.

15 Claims, 12 Drawing Sheets

(a)

(b)

(c)

(d)

(e)

(a)

(b)

(a)    (b)

IMAGE DISPLAY APPARATUS AND METHOD FOR OPERATING THE SAME

This application is the National Phase of PCT/KR2010/005548 filed on Aug. 20, 2010, which claims priority under 35 U.S.C. 119(e) to U.S. Provisional Application No. 61/235,369 filed on Aug. 20, 2009 all of which are hereby expressly incorporated by reference into the present application.

TECHNICAL FIELD

The present invention relates to an image display apparatus and a method for operating the same, and more particularly, to an image display apparatus for displaying a two-dimensional (2D) image along with a three-dimensional (3D) image and a method for operating the same.

BACKGROUND ART

An image display apparatus has a function of displaying images viewable to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting such as robustness against noise, less data loss, ease of error correction, and the ability to provide high-definition, clear images. Digital broadcasting also allows interactive services for viewers.

Many studies have recently been conducted on 3D imaging and stereoscopy is being widely accepted and popular in computer graphics and other various environments and technologies.

DISCLOSURE OF INVENTION

Technical Problem

Therefore, the present invention has been made in view of the above problems, and it is an object of the present invention to provide an image display apparatus for displaying a 2D image along with a 3D image and a method for operating the same.

It is another object of the present invention to provide an image display apparatus for facilitating a variety of settings for 3D image viewing, and a method for operating the same.

Solution to Problem

In accordance with an aspect of the present invention, the above and other objects can be accomplished by the provision of a method for operating an image display apparatus, including receiving an image, separating the image into at least one of a 2D image area or a 3D image area, and displaying the at least one of the 2D or 3D image areas along with an area control object for changing a position or size of the 2D or 3D image area, on a display.

In accordance with another aspect of the present invention, provided herein is an image display apparatus including a controller to separate an input image into at least one of a 2D image area or a 3D image area, and a display to display the at least one of the 2D or 3D image areas along with an area control object for changing a position or size of the 2D or 3D image area, on a display.

Advantageous Effects of Invention

As is apparent from the above description of the embodiments of the present invention, an input image is separated into a 2D image area and a 3D image area and the 2D and 3D image areas are displayed together. Since an area control object is also displayed, the user can change the 2D or 3D image area in position or size by shifting the area control object.

As a display displays a picture control menu, a preview control menu, and/or a 3D format control menu together, various settings are facilitated during 3D image viewing.

The 2D or 3D image area is displayed, changed in at least one of sharpness, brightness or contrast according to a user input. Thus user convenience is increased.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

Exemplary embodiments of the present invention will be described below with reference to the attached drawings.

The terms "module", "portion", and "unit" attached to describe the names of components are used herein to help the understanding of the components and thus they should not be considered as having specific meanings or roles. Accordingly, the terms "module", "portion", and "unit" may be interchangeable in their use.

Figure 1:
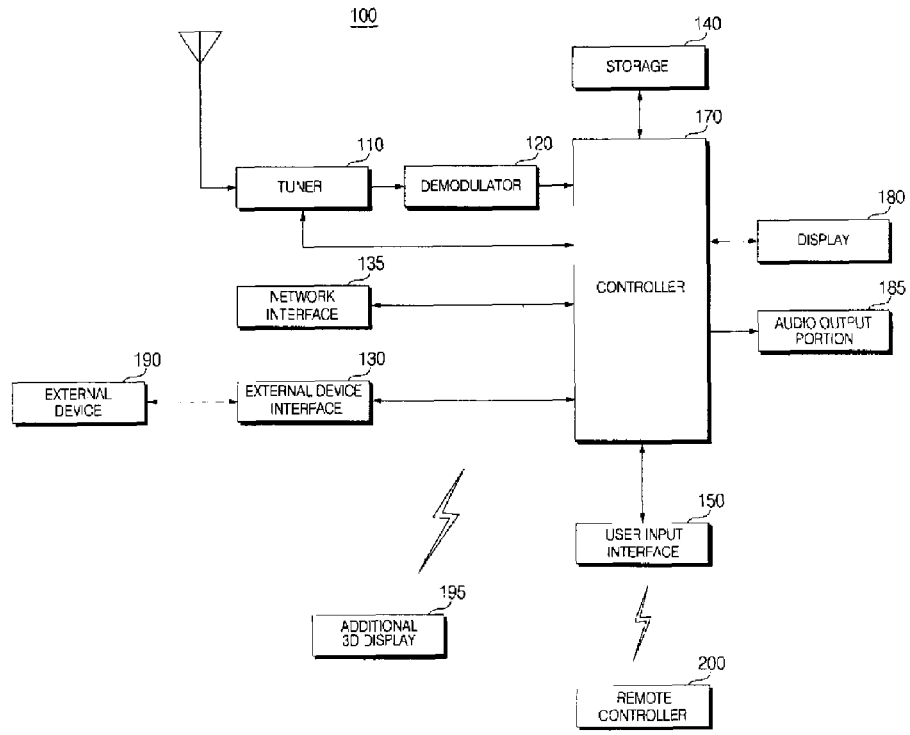
FIG. 1 is a block diagram of an image display apparatus according to an exemplary embodiment of the present invention.

FIG. 1 is a block diagram of an image display apparatus according to an exemplary embodiment of the present invention.

Referring to FIG. 1, an image display apparatus 100 according to an exemplary embodiment of the present invention may include a tuner 110, a demodulator 120, an external device interface 130, a network interface 135, a storage 140, a user input interface 150, a controller 170, a display 180, an audio output portion 185, and an additional 3D display 195.

The tuner 110 selects a Radio Frequency (RF) broadcast signal corresponding to a channel selected by a user from among a plurality of RF broadcast signals received through an antenna or an RF broadcast signal corresponding to each of pre-memorized channels and downconverts the RF broadcast signal to a digital Intermediate Frequency (IF) signal or an analog baseband Audio/Video (A/V) signal.

More specifically, if the RF broadcast signal is a digital broadcast signal, the tuner 110 downconverts the RF broadcast signal to a digital IF signal, DIF. On the other hand, if the RF broadcast signal is an analog broadcast signal, the tuner 110 downconverts the RF broadcast signal to an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be able to receive RF broadcast signals from an Advanced Television Systems Committee (ATSC) single-carrier system or from a Digital Video Broadcasting (DVB) multi-carrier system.

The tuner 110 may sequentially select RF broadcast signals corresponding to all broadcast channels previously memorized in the image display apparatus 100 by a channel-add function among from a plurality of RF signals received through the antenna, and may downconvert the selected RF broadcast signals to IF signals or baseband A/V signals.

The demodulator 120 receives the digital IF signal DIF from the tuner 110 and demodulates the digital IF signal DIF.

For example, if the digital IF signal DIF is an ATSC signal, the demodulator 120 performs 8-Vestigal SideBand (VSB) demodulation on the digital IF signal DIF. The demodulator 120 may also perform channel decoding. For the channel decoding, the demodulator 120 may include a Trellis decoder (not shown), a deinterleaver (not shown) and a Reed-Solomon decoder (not shown) and thus perform Trellis decoding, deinterleaving and Reed-Solomon decoding.

For example, if the digital IF signal DIF is a DVB signal, the demodulator 120 performs Coded Orthogonal Frequency Division Multiple Access (COFDMA) demodulation on the digital IF signal DIF. The demodulator 120 may also perform channel decoding. For the channel decoding, the demodulator 120 may include a convolution decoder (not shown), a deinterleaver (not shown), and a Reed-Solomon decoder (not shown) and thus perform convolutional decoding, deinterleaving, and Reed-Solomon decoding.

The demodulator 120 may perform demodulation and channel decoding on the digital IF signal DIF received from the tuner 120, thereby obtaining a stream signal TS. The stream signal TS may be a signal in which a video signal, an audio signal and a data signal are multiplexed. For example, the stream signal TS may be a Moving Picture Experts Group-2 (MPEG-2) Transport Stream (TS) signal obtained by multiplexing an MPEG-2 video signal and a Dolby AC-3 audio signal. The MPEG-2 TS signal may include a 4-byte header and a 184-byte payload.

In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output portion 185, respectively.

The external device interface 130 may interface between an external device 190 and the image display apparatus 100. For the interfacing, the external device interface 130 may include an A/V Input/Output (I/O) portion (not shown) or a wireless communication module (not shown).

The external device interface 130 may be connected wirelessly or wiredly to the external device 190 such as a Digital Versatile Disc (DVD), a Blu-ray disc, a game player, a camera, a camcorder, or a computer (e.g. a laptop computer). Then, the external device interface 130 receives video, audio, and/or data signals from the external device 190 and transmits the received external input signals to the controller 170. In addition, the external device interface 130 may output video, audio, and/or data signals processed by the controller 170 to the external device 190. In order to receive or transmit audio, video, and/or data signals from or to the external device 190, the external device interface 130 may include the A/V I/O portion (not shown) or the wireless communication module (not shown).

To provide the video and audio signals received from the external device 190 to the image display apparatus 100, the A/V I/O portion may include a Universal Serial Bus (USB) port, a Composite Video Banking Sync (CVBS) port, a component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module may perform short-range wireless communication with other electronic devices. For the short-range wireless communication over a network, the wireless communication module may operate in compliance with communication standards such as Bluetooth, Radio-Frequency IDentification (RFID), Infrared Data Association (IrDA), Ultra WideBand (UWB), ZigBee, and Digital Living Network Alliance (DLNA).

The external device interface 130 may be connected to various set-top boxes through at least one of the USB port, the CVBS port, the component port, the S-video port, the DVI port, the HDMI port, the RGB port, or the D-sub port and may thus receive data from or transmit data to the various set-top boxes.

Further, the external device interface 130 may transmit data to or receive data from the additional 3D display 195.

The network interface 135 interfaces between the image display apparatus 100 and a wired/wireless network such as the Internet. The network interface 135 may include an Ethernet port for connection to a wired network. For connection to wireless networks, the network interface 135 may operate in conformance with communication standards such as Wireless Local Area Network (WLAN) (i.e., Wi-Fi), Wireless Broadband (Wibro), World Interoperability for Microwave Access (WiMax), and High Speed Downlink Packet Access (HSDPA).

The network interface 135 may receive contents or data from the Internet, a content provider, or a network provider over a network. Specifically, the received contents or data may include contents such as movies, advertisements, games, Video-on-Demand (VoD) files, and broadcast signals and information related to the contents. The network interface 135 may also receive update information and update files of firmware from the network operator. The network interface 135 may transmit data to the Internet, the content provider, or the network provider.

The network interface 135 may be connected to, for example, an Internet Protocol (IP) TV. To enable interactive communication, the network interface 135 may provide video, audio and/or data signals received from an IPTV set-top box to the controller 170 and provide signals processed by the controller 170 to the IPTV set-top box.

Depending on the types of transmission networks, the IPTV may refer to Asynchronous Digital Subscriber Line-TV (ADSL-TV), Very high data rate Digital Subscriber Line-TV (VDSL), Fiber To The Home-TV (HTTH-TV), TV over DSL, Video over DSL, TV over IP (IPTV), Broadband TV (BTV), etc. In addition, the IPTV may cover Internet TV and full browsing TV in its meaning.

The storage 140 may store various programs for processing and controlling signals by the controller 170, and may also store processed video, audio and/or data signals.

The storage 140 may temporarily store a video, audio and/or data signal received from the external device interface 130. The storage 140 may memorize broadcast channels by the channel-add function such as a channel map.

The storage 140 may include, for example, at least one of a flash memory-type storage medium, a hard disc-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as Electrical Erasable and Programmable ROM (EEPROM). The image display apparatus 100 may play content files stored in the storage 140 (e.g. video files, still image files, music files, and text files), for the user.

While the storage 140 is shown in FIG. 1 as configured separately from the controller 170, to which the present invention is not limited, the storage 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys (not shown), such as inputs of a power key, a channel key, and a volume key, and setting values.

Also, the user input interface 150 may transmit a user input signal received from a sensor unit (not shown) for sensing a user's gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 130 into a number of signals and process the demultiplexed signals so that the processed signals can be output as audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output portion 185. Also, the audio signal processed by the controller 170 may be transmitted to the external output device through the external device interface 130.

While not shown in FIG. 1, the controller 170 may include a demultiplexer and a video processor, which will be described later with reference to FIG. 2.

Besides, the controller 170 may provide overall control to the image display apparatus 100. For example, the controller 170 may control the tuner 110 to select an RF broadcast signal corresponding to a user-selected channel or a pre-memorized channel.

The controller 170 may control the image display apparatus 100 according to a user command received through the user input interface 150 or according to an internal program. For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output portion 185.

In another example, the controller 170 outputs a video or audio signal received from the external device 190 such as a camera or a camcorder through the external device interface 130 to the display 180 or the audio output portion 185 according to an external device video play command received through the external device interface 150.

The controller 170 may control the display 180 to display images. For instance, the controller 170 may control the display 180 to display a broadcast image received from the tuner 110, an external input image received through the external device interface 130, an image received through the network interface 130, or an image stored in the storage 140.

The image displayed on the display 180 may be a two-dimensional (2D) or three-dimensional (3D) (stereoscopic) still image or moving picture.

The controller 170 controls a particular object in the image displayed on the display 180 to be rendered as a 3D object. For example, the particular object may be at least one of a linked Web page (e.g. from a newspaper, a magazine, etc.), an Electronic Program Guide (EPG), a menu, a widget, an icon, a still image, a moving picture, or text.

This 3D object may be processed to have a different depth from the image displayed on the display 180. Preferably, the 3D object may appear protruding relative to the image displayed on the display 180.

The controller 170 may locate the user based on an image captured by a camera portion (not shown). Specifically, the controller 170 may measure the distance (z-axis coordinates) between the user and the image display apparatus 100. In addition, the controller 170 may calculate x-axis and y-axis coordinates corresponding to the position of the user on the display 180.

The image display apparatus 100 may further include a channel browsing processor (not shown) for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are encoded or as they are. Also, it is possible to encode the thumbnail images into a stream and output the stream to the controller 170. The controller 170 may display a thumbnail list including a plurality of received thumbnail images on the display 180. The thumbnail list may be displayed in a part of the display 180 with an image displayed on the display 180, that is, as a compact view, or the thumbnail list may occupy almost all area of the display 180 as a full view.

The display 180 generates driving signals by converting a processed video signal, a processed data signal, an On Screen Display (OSD) signal, and a control signal received from the controller 170 or a video signal, a data signal, and a control signal received from the external device interface 130.

The display 180 may be implemented into various types of displays such as a Plasma Display Panel (PDP), a Liquid Crystal Display (LCD), an Organic Light-Emitting Diode (OLED), and a flexible display. Preferably, the display 180 is configured as a 3D display according to an exemplary embodiment of the present invention.

For 3D visualization, the display 180 may be configured into an auto-stereoscopic 3D display (glasses-free) or a traditional stereoscopic 3D display (with glasses).

Auto-stereoscopy is any method of displaying 3D images without any additional display, for example, special glasses on the part of a user. Thus, the display 180 displays 3D images on its own. Renticular and parallax barrier are examples of auto-stereoscopic 3D imaging.

The traditional stereoscopy requires an additional display besides the display 180 in order to display 3D images. The additional display may be a Head Mount Display (HMD) type, a glasses type, etc. As special 3D glasses, polarized glasses operate in a passive manner, whereas shutter glasses operate in an active manner. Also, HMD types may be categorized into passive ones and active ones.

Exemplary embodiments of the present invention will be described, centering on 3D glasses as the additional 3D display 195 for 3D visualization. The 3D glasses 195 may operate in a passive or active manner. The following description will be made in the context of the additional 3D display 195 being active shutter glasses.

The display 180 may also be implemented as a touch screen so that it is used not only as an output device but also as an input device.

The audio output portion 185 may receive a processed audio signal (e.g., a stereo signal, a 3.1-channel signal or a 5.1-channel signal) from the controller 170 and output the received audio signal as voice. The audio output portion 185 may be implemented into various types of speakers.

To sense a user's gesture, the image display apparatus 100 may further include the sensor unit (not shown) that has at least one of a touch sensor, a voice sensor, a position sensor, or a motion sensor, as stated before. A signal sensed by the sensor unit may be output to the controller 170 through the user input interface 150.

The controller 170 may sense a user's gesture from an image captured by the camera portion or a signal sensed by the sensor unit, or by combining the captured image and the sensed signal.

The remote controller 200 transmits a user input to the user input interface 150. For the transmission of a user input, the remote controller 200 may use various communication techniques such as Bluetooth, RF, IR, Ultra WideBand (UWB) and ZigBee. In addition, the remote controller 200 may receive a video signal, an audio signal and/or a data signal from the user input interface 150 and output the received signals visually or audibly.

The above-described image display apparatus 100 may be a fixed digital broadcast receiver capable of receiving at least one of ATSC (8-VSB) broadcast programs, DVB-T (COFDM) broadcast programs, or ISDB-T (BST-OFDM) broadcast programs. Alternatively, the image display apparatus 100 may be a mobile digital broadcast receiver capable of at least one of terrestrial DMB broadcast programs, satellite DMB broadcast programs, ATSC-M/H broadcast programs, DVB-H (COFDM) broadcast programs, or Media Forward Link Only (MediaFLO) broadcast programs, or a mobile digital broadcast receiver capable of receiving cable, satellite and/or IPTV broadcast programs.

The image display apparatus 100 as set forth herein may be any of a TV receiver, a mobile phone, a smart phone, a laptop computer, a digital broadcasting terminal, a Personal Digital Assistant (PDA), a Portable Multimedia Player (PMP), etc.

The block diagram of the image display apparatus 100 illustrated in FIG. 1 is an exemplary embodiment of the present invention. Depending on the specification of the image display apparatus 100 in real implementation, the components of the image display apparatus 100 may be incorporated, added or omitted. That is, two or more components are incorporated into one component or one component may be configured as separate components, when needed. In addition, the function of each block is described for the purpose of describing the exemplary embodiment of the present invention and thus specific operations or devices should not be construed as limiting the scope and spirit of the present invention.

Figure 2:
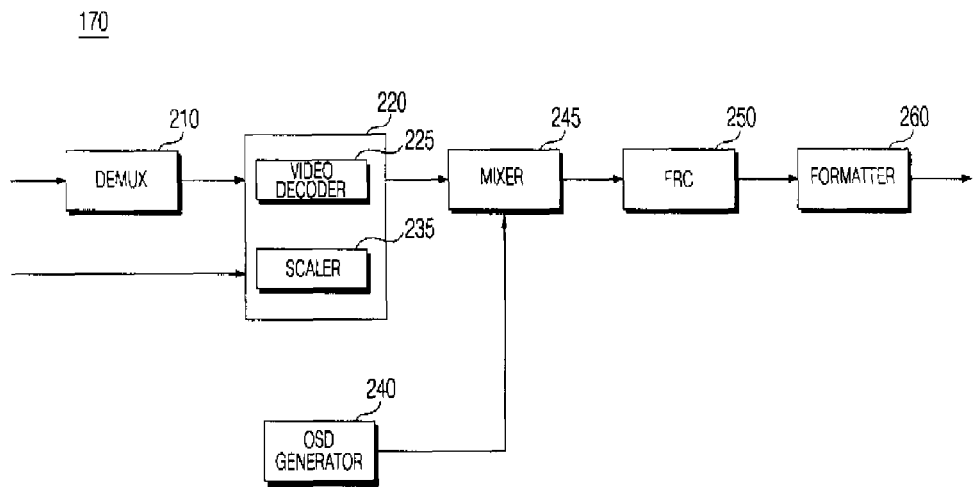
FIG. 2 is a block diagram of a controller illustrated in FIG. 1.
Figure 3:
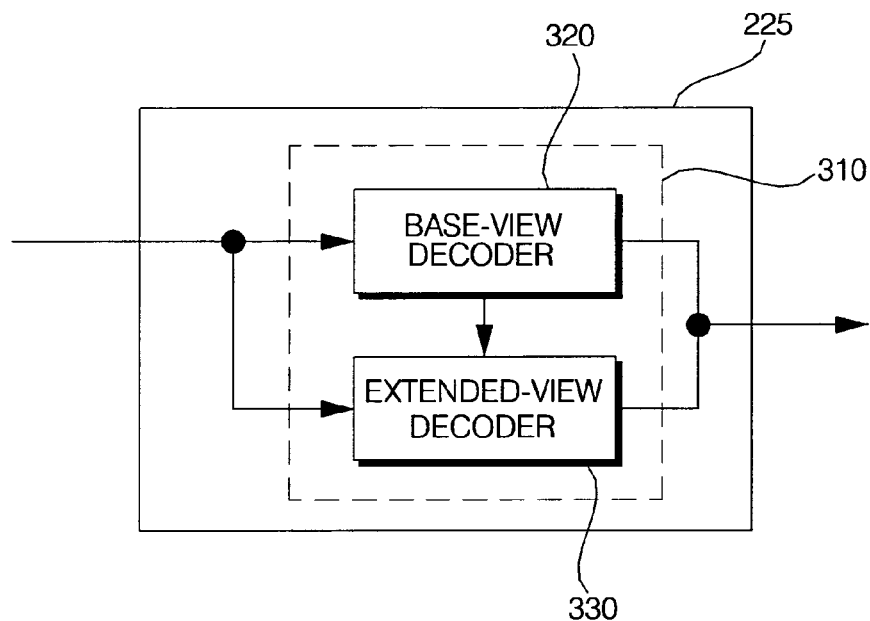
FIG. 3 is a block diagram of a video decoder illustrated in FIG. 2.
Figure 4:
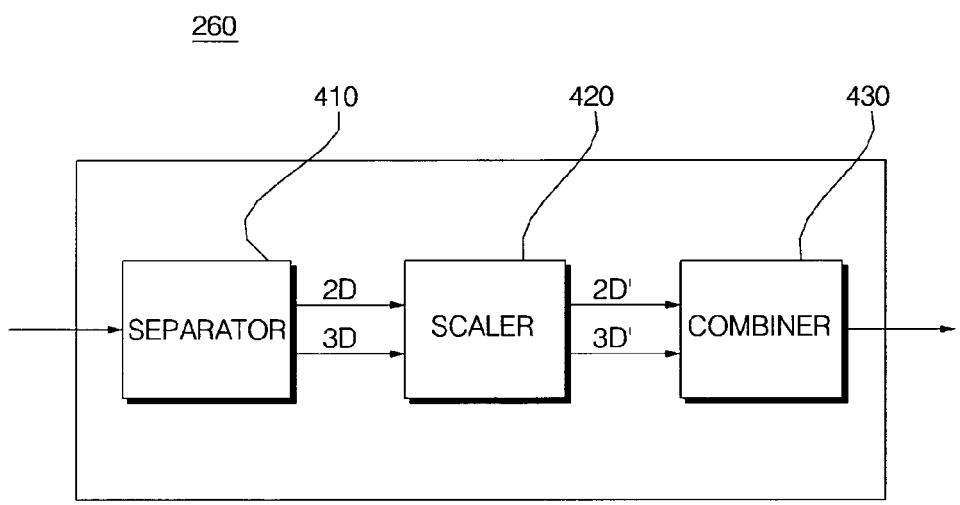
FIG. 4 is a block diagram of a formatter illustrated in FIG. 2.
Figure 5:
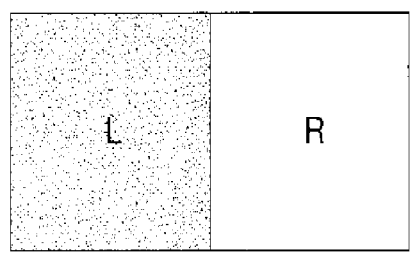
FIGS. 5A to 5E illustrate 3D formats.
Figure 5:
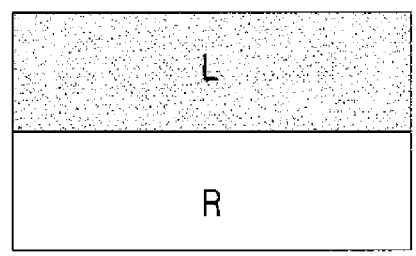
Figure 5:
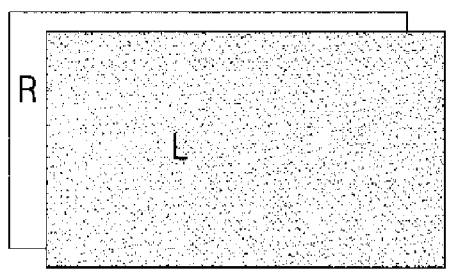
Figure 5:
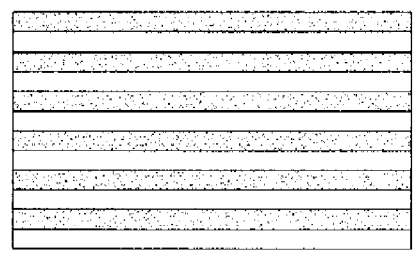
Figure 5:
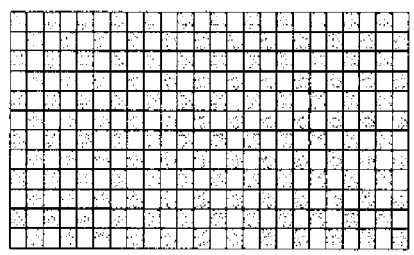
Figure 6:
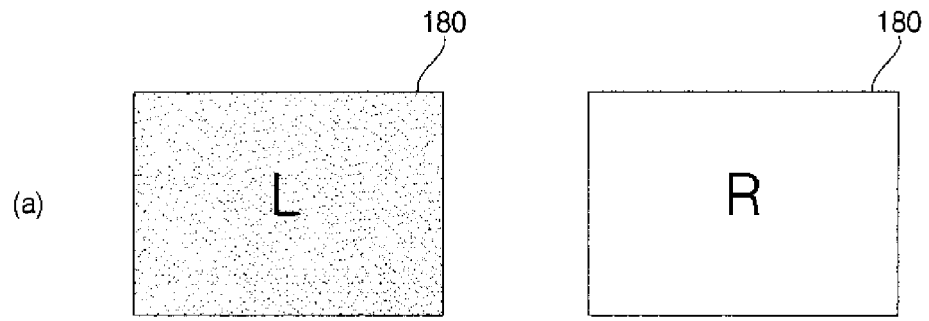
FIGS. 6A and 6B illustrate operations of an additional glasses-type display according to 3D formats illustrated in FIGS. 5A to 5E.
Figure 6:
Figure 6:
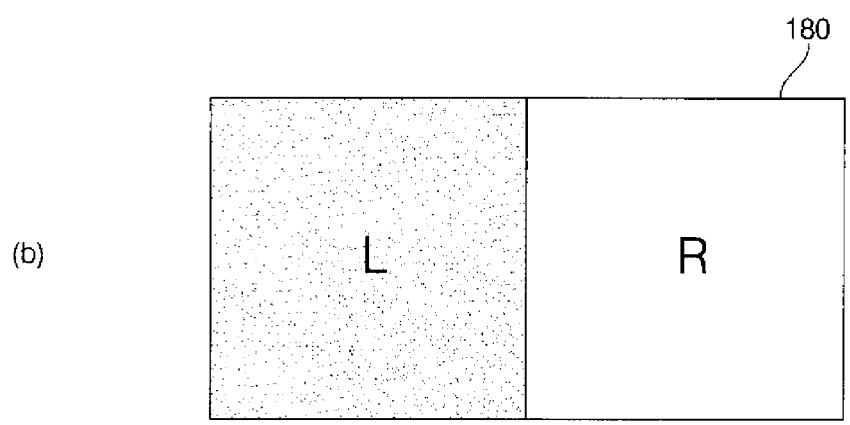
Figure 6:

FIG. 2 is a block diagram of the controller illustrated in FIG. 1, FIG. 3 is a block diagram of a video decoder illustrated in FIG. 2, FIG. 4 is a block diagram of a formatter illustrated in FIG. 2, FIGS. 5A to 5E illustrate 3D formats, and FIGS. 6A and 6B illustrate operations of an additional glasses-type display according to 3D formats illustrated in FIGS. 5A to 5E.

Referring to FIG. 2, the controller 170 may include a Demultiplexer (DEMUX) 210, a video processor 220, an OSD generator 240, a mixer 245, a Frame Rate Converter (FRC) 250, and a formatter 260 according to an exemplary embodiment of the present invention. The controller 170 may further include an audio processor (not shown) and a data processor (not shown).

The DEMUX 210 demultiplexes an input stream. For example, the DEMUX 210 may demultiplex an MPEG-2 TS into a video signal, an audio signal, and a data signal. The input stream signal may be received from the tuner 110, the demodulator 120 or the external device interface 130.

The video processor 220 may process the demultiplexed video signal. For the video signal processing, the video processor 220 may include a video decoder 225 and a scaler 235.

The video decoder 225 decodes the demultiplexed video signal and the scaler 235 scales the resolution of the decoded video signal so that the video signal can be displayed on the display 180.

The video decoder 225 may be provided with decoders that operate based on various standards.

FIG. 3 illustrates an example of a 3D video decoder 310 for decoding a 3D image signal in the video decoder 225.

The 3D video decoder receives a demultiplexed video signal which may be, for example, an MVC-coded video signal, a dual AVC-coded video signal, or a mixture of individually coded left-eye and right-eye images.

If the input demultiplexed video signal is the mixture signal of coded left-eye and right-eye images, a 2D video decoder may be still used for decoding the input demultiplexed video signal. For example, if the demultiplexed video signal is an MPEG-2 coded video signal or an AVC-coded video signal, it may be decoded by an MPE-2 decoder or an AVC decoder.

The 3D video decoder 310 may be configured to be an MVC decoder including a base-view decoder 320 and an extended-view decoder 330.

For example, if the coded 3D video signal input to the 3D video decoder 310 includes an MVC-coded extended-view video signal, a base-view video signal being the counterpart of the extended-view video signal should be decoded in order to decode the extended-view video signal. Accordingly, a base-view video signal decoded by the base-view decoder 320 is provided to the extended-view decoder 330.

As a consequence, a time delay occurs while the extended-view video signal of the input 3D video signal is decoded in the extended-view decoder 330. Then the decoded base-view video signal and the decoded extended-view video signal are mixed as the decoded 3D video signal.

For example, if the coded 3D video signal input to the 3D video decoder 310 includes an AVC-coded extended-view video signal, a base-view video signal and the extended-view video signal may be decoded in parallel, compared to the MVC-coded 3D video signal. Accordingly, the base-view decoder 320 and the extended-view decoder 330 decode the base-view video signal and the extended-view video signal, independently. Then the decoded base-view video signal and the decoded extended-view video signal are mixed as the decoded 3D video signal.

The decoded video signal processed by the video processor 220 may be a 2D video signal, a 3D video signal, or a combination of both.

For example, an external video signal received from the external device 190 or a video signal of a broadcast signal received from the tuner 110 is a 2D video signal, a 3D video signal, or a combination of both. Accordingly, the controller 170, especially the video processor 220 may output a processed 2D video signal, a processed 3D video signal, and a combination of both.

The decoded video signal from the video processor 220 may have any of various available formats. For example, the decoded video signal may be a 3D video signal with a color image and a depth image or a 3D video signal with multi-view image signals. The multi-view image signals may include, for example, a left-eye image signal and a right-eye image signal.

For 3D visualization, such 3D formats as illustrated in FIGS. 4A to 4E are available. The 3D formats are a side-by-side format (FIG. 5A), a top/down format (FIG. 5B), a frame sequential format (FIG. 5C), an interlaced format (FIG. 5D), and a checker box format (FIG. 5E). A left-eye image L and a right-eye image R are arranged side by side in the side by side format. The left-eye image L and the right-eye image R are stacked vertically in the top/down format, while they are arranged in time division in the frame sequential format. In the interlaced format, the left-eye image L and the right-eye image R alternate line by line. The left-eye image L and the right-eye image R are mixed on a box basis in the checker box format.

The OSD generator 240 generates an OSD signal on its own or according to a user input. For example, the OSD generator 240 may generate signals by which a variety of information is displayed as graphic images or text on the display 180, according to user input signals or control signals. The OSD signal may include various data such as a User Interface (UI) screen, a variety of menu screens, widgets, icons, etc. Also, the OSD signal may include a 2D object and/or a 3D object.

The mixer 250 may mix the decoded video signal processed by the video processor 220 with the OSD signal generated from the OSD generator 240. The OSD signal and the decoded video signal each may include at least one of a 2D signal or a 3D signal.

The FRC 255 may change the frame rate of the mixed vide signal received from the mixer 245. For example, a frame rate of 60 Hz is converted to a frame rate of 120 or 240 Hz. When the frame rate is changed from 60 Hz to 120 Hz, the same first frame is inserted between a first frame and a second frame, or a predicted third frame is inserted between the first and second frames. If the frame rate is changed from 60 Hz to 240 Hz, three identical frames or three predicted frames are inserted between the first and second frames.

It is also possible to maintain the frame rate of the input image without frame rate conversion. Preferably, when the FRC 250 receives a 2D video signal, it may output the 2D video signal without frame rate conversion. On the other hand, when the FRC 250 receives a 3D video signal, it may change the frame rate of the 3D video signal in the above-described manner.

Referring to FIG. 4, the formatter 260 may include a separator 410, a scaler 420, and a combiner 430.

The separator 410 may separate a 2D video signal, 2D and a 3D video signal, 3D from the mixed video signal of the OSD signal and the decoded video signal received from the mixer 245. During the signal separation, the sizes of the 2D video signal 2D and the 3D video signal 3D may be changed according to values that have been set or according to a user input.

The scaler 420 may scale the 2D and 3D video signals, 2D and 3D. The scaling may refer to scaling of the image area of the 2D or 3D video signal 2D or 3D according to its size. This operation mode is referred to as a scaling mode. The resulting scaled 2D and 3D video signals 2D' and 3D' may be output to the combiner 430.

On the other hand, the scaler 420 may not perform scaling, for example, the image area of the 2D or 3D video signal 2D or 3D according to its size. This operation mode is referred to as a bypass mode. Thus the scaler 420 may output the 2D and 3D video signals 2D' and 3D' that have not been scaled to the combiner 430.

The combiner 430 combines the received 2D and 3D video signals 2D' and 3D'. That is, the combiner 430 subjects the 2D video signal 2D' to 2D signal processing and the 3D video signal 3D' to 3D signal processing. Specifically, the 3D video signal 3D' may be arranged in a 3D format illustrated in FIGS. 5A to 5E during the 3D signal processing, and the 2D video signal 2D' may be processed without 3D formatting during the 2D signal processing.

The formatter 260 may change the format of the 3D video signal, for example, to one of the 3D formats illustrated in FIGS. 5A to 5E irrespective of the format of the 3D video signal. Accordingly, the additional glasses-type display may operate according to the changed 3D format as illustrated in FIGS. 6A and 6B.

FIG. 6A illustrates an exemplary operation of the shutter glasses 195, when the formatter 260 outputs a 3D video signal in the frame sequential format illustrated in FIG. 5C.

When the left-eye image L is displayed on the display 180, the left lens is open and the right lens is shut off in the shutter glasses 195. When the right-eye image R is displayed on the display 180, the left lens is shut off and the right lens is open in the shutter glasses 195.

FIG. 6B illustrates another exemplary operation of the polarized glasses 195, when the formatter 260 outputs a 3D video signal in the side-by-side format illustrated in FIG. 5A. The polarized glasses 195 are passive ones, with both lenses kept open.

Meanwhile, the formatter 260 may convert a 2D video signal to a 3D video signal. For example, the formatter 260 may detect edges or a selectable object from the 2D video signal and generate a 3D video signal with an object based on the detected edges or the selectable object. This 3D video signal may be arranged as separate left-eye and right-eye image signals L and R, as described before.

Herein, a 3D video signal is a signal including a 3D object. For example, the 3D object may be a Picture-In-Picture (PIP) image (still or moving), an EPG describing information about broadcast programs, a menu, a widget, an icon, text, an object within an image, a figure, a background, or a Web page (from a newspaper, a magazine, etc.).

The audio processor (not shown) of the controller 170 may process the demultiplexed audio signal. For the audio signal processing, the audio processor may have a plurality of decoders.

If the demultiplexed audio signal is a coded audio signal, the audio processor of the controller 170 may decode the audio signal. For example, if the demultiplexed audio signal is an MPEG-2 coded audio signal, it may be decoded by an MPEG-2 decoder. If the demultiplexed audio signal is an MPEG-4 Bit Sliced Arithmetic Coding (BSAC) coded audio signal for terrestrial DMB, it may be decoded by an MPEG-4 decoder. If the demultiplexed audio signal is an MPEG-2-Advanced Audio Coding (AAC) coded audio signal for satellite DMB or DVB-H, it may be decoded by an AAC decoder. If the demultiplexed audio signal is a Dolby AC-3 coded audio signal, it may be decoded by an AC-3 decoder.

The audio processor of the controller 170 may also adjust the base, treble, and volume of the audio signal.

The data processor (not shown) of the controller 170 may process the data signal obtained by demultiplexing the input stream signal. For example, if the data signal is an encoded signal such as an EPG which includes broadcast information specifying the start time, end time, etc. of scheduled broadcast TV or radio programs, the controller 170 may decode the data signal. Examples of an EPG include ATSC-Program and System Information Protocol (PSIP) information and DVB-Service Information (SI). ATSC-PSIP information or DVB-SI information may be included in the header of a TS, i.e., a 2-byte header of an MPEG-2 TS.

While it is shown in FIG. 2 that the mixer 245 mixes signals received from the OSD generator 240 and the video processor 220 and then the formatter 260 performs 3D processing on the mixed signal, to which the present invention is not limited, the mixer 245 may reside after the formatter 260. Thus the formatter 260 may perform 3D processing on a signal received from the video processor 220, the OSD generator 240 may generate an OSD signal and subject the OSD signal to 3D processing, and then the mixer 245 may mix the processed 3D signals from the formatter 260 and the OSD generator 240.

The block diagram of the controller 170 illustrated in FIG. 2 is an exemplary embodiment of the present invention. Depending on the specification of the controller 170 in real implementation, the components of the controller 170 may be incorporated, added or omitted. Especially, the FRC 250 and the formatter 260 may be configured separately outside the controller 170.

Figure 7:
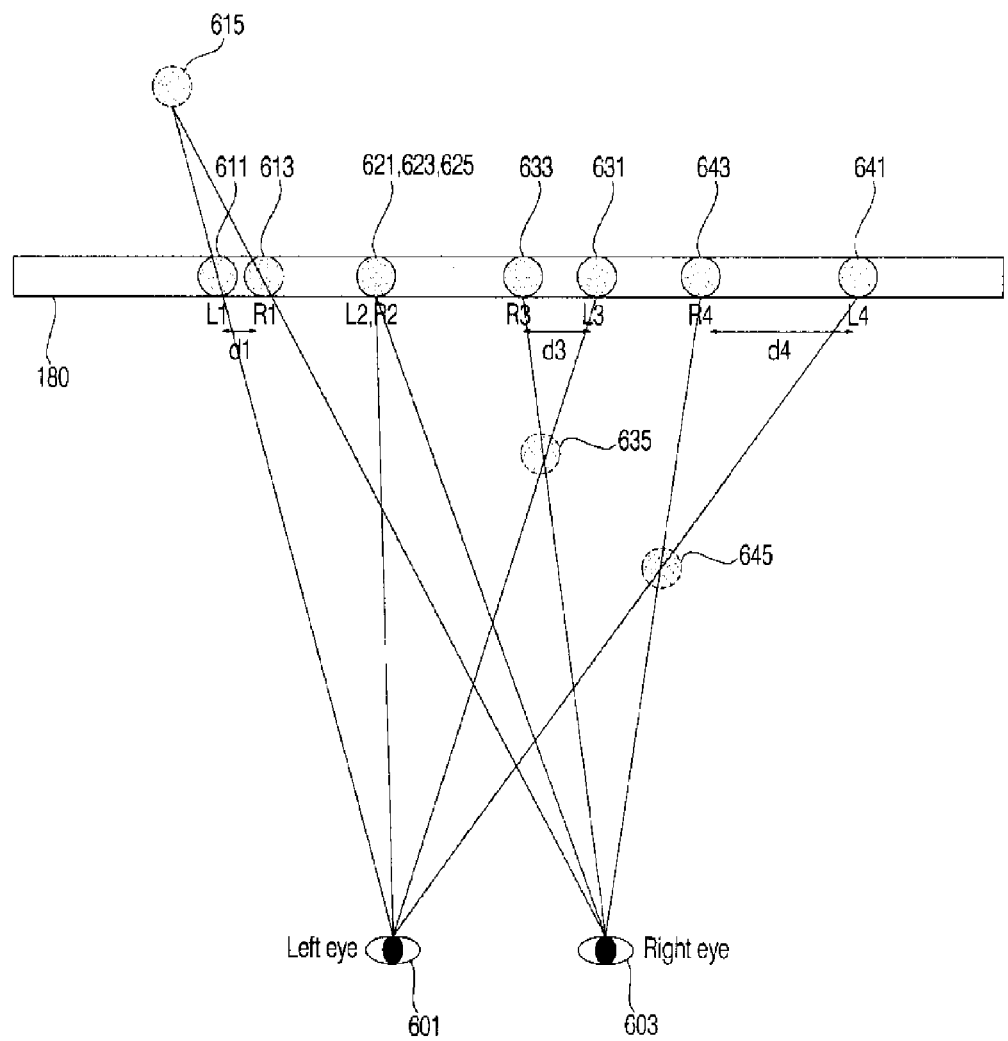
FIG. 7 illustrates formation of 3D images by combining left-eye and right-eye images.
Figure 8:
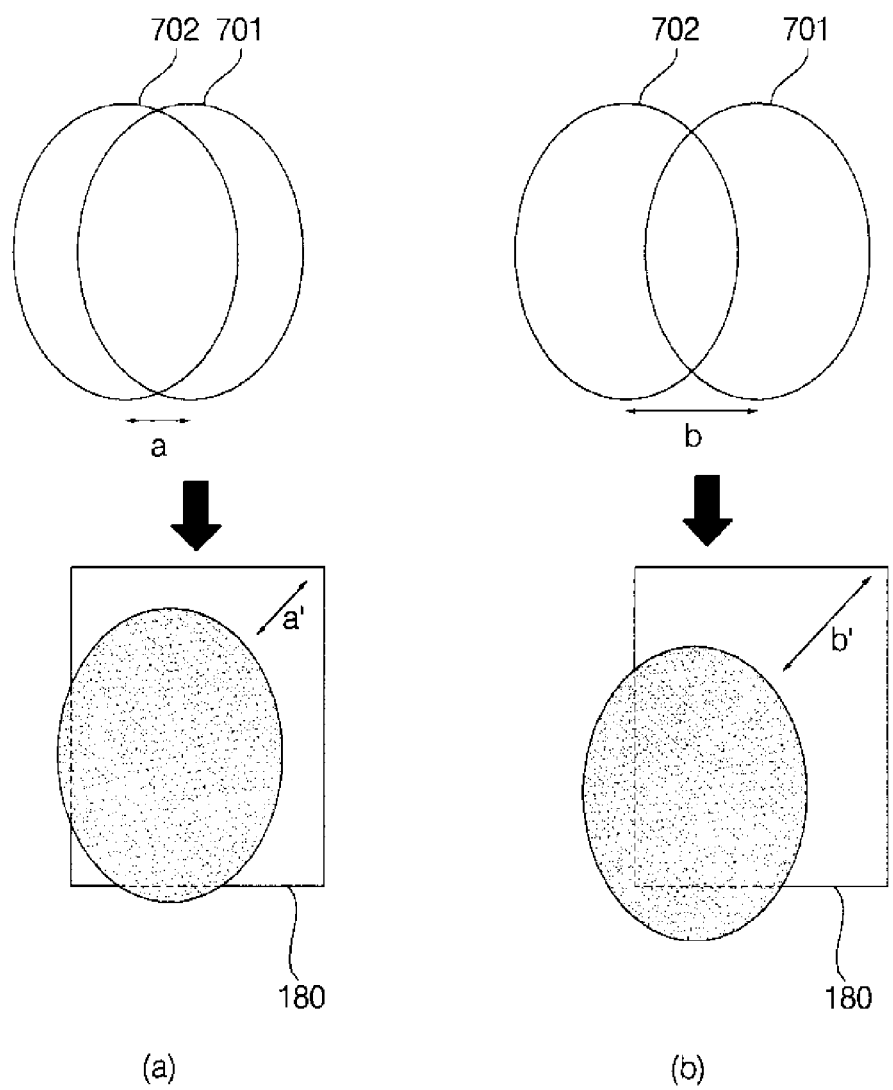
FIGS. 8A and 8B illustrate different depth illusions according to different disparities between a left-eye image and a right-eye image.

FIG. 7 illustrates formation of 3D images by combining left-eye and right-eye images, and FIGS. 8A and 8B illustrate different depth illusions according to different disparities between a left-eye image and a right-eye image.

Referring to FIG. 7, there are a plurality of images or objects 615, 625, 635 and 645. A first object 615 is created by combining a first left-eye image 611 (L1) based on a first left-eye image signal with a first right-eye image 613 (R1) based on a first right-eye image signal, with a disparity d1 between the first left-eye and right-eye images 611 and 163. The user sees an image as formed at the intersection between a line connecting a left eye 601 to the first left-eye image 611 and a line connecting a right eye 603 to the first right-eye image 613. Therefore, the user is tricked into perceiving the first object 615 as behind the display 180.

As a second object 625 is created by overlapping a second left-eye image 621 (L2) with a second right-eye image 623 (R2) on the display 180, thus with a disparity of 0 between the second left-eye and right-eye images 621 and 623. Thus, the user perceives the second object 625 as on the display 180.

A third object 635 is created by combining a third left-eye image 631 (L3) with a third right-eye image 633 (R3), with a disparity d3 between the third left-eye and right-eye images 631 and 633. A fourth object 645 is created by combining a fourth left-eye image 641 (L4) with a fourth right-eye image 643 (R4), with a disparity d4 between the fourth left-eye and right-eye images 641 and 643.

The user perceives the third and fourth objects 635 and 645 at image-formed positions, that is, as being positioned before the display 180.

Because the disparity d4 between the fourth left-eye and right-eye images 641 and 643 is larger than the disparity d3 between the third left-eye and right-eye images 631 and 633, the fourth object 645 appears more protruding than the third object 635.

In exemplary embodiments of the present invention, the distances between the display 180 and the objects 621, 625, 635 and 645 are represented as depths. When an object is perceived to the user as being positioned behind the display 180, the depth of the object is negative-signed. On the other hand, when an object is perceived to the user as being positioned before the display 180, the depth of the object is positive-signed. Therefore, as an object appears more protruding to the user, it is deeper, that is, its depth is larger.

Referring to FIGS. 8A and 8B, the disparity a between a left-eye image 701 and a right-eye image 702 in FIG. 7A is smaller than the disparity b between the left-eye image 701 and the right-eye image 702 in FIG. 7B. Consequently, the depth a' of a 3D object created in FIG. 7A is smaller than the depth b' of a 3D object created in FIG. 7B.

In the case where a left-eye image and a right-eye image are combined to a 3D image, if the left-eye and right-eye images of 3D images are apart from each other by different disparities, the 3D images are perceived to the user as formed at different positions. This means that the depth of a 3D image or 3D object formed by a left-eye image and a right-eye image in combination may be controlled by adjusting the disparity of the left-eye and right-eye images.

Figure 9:
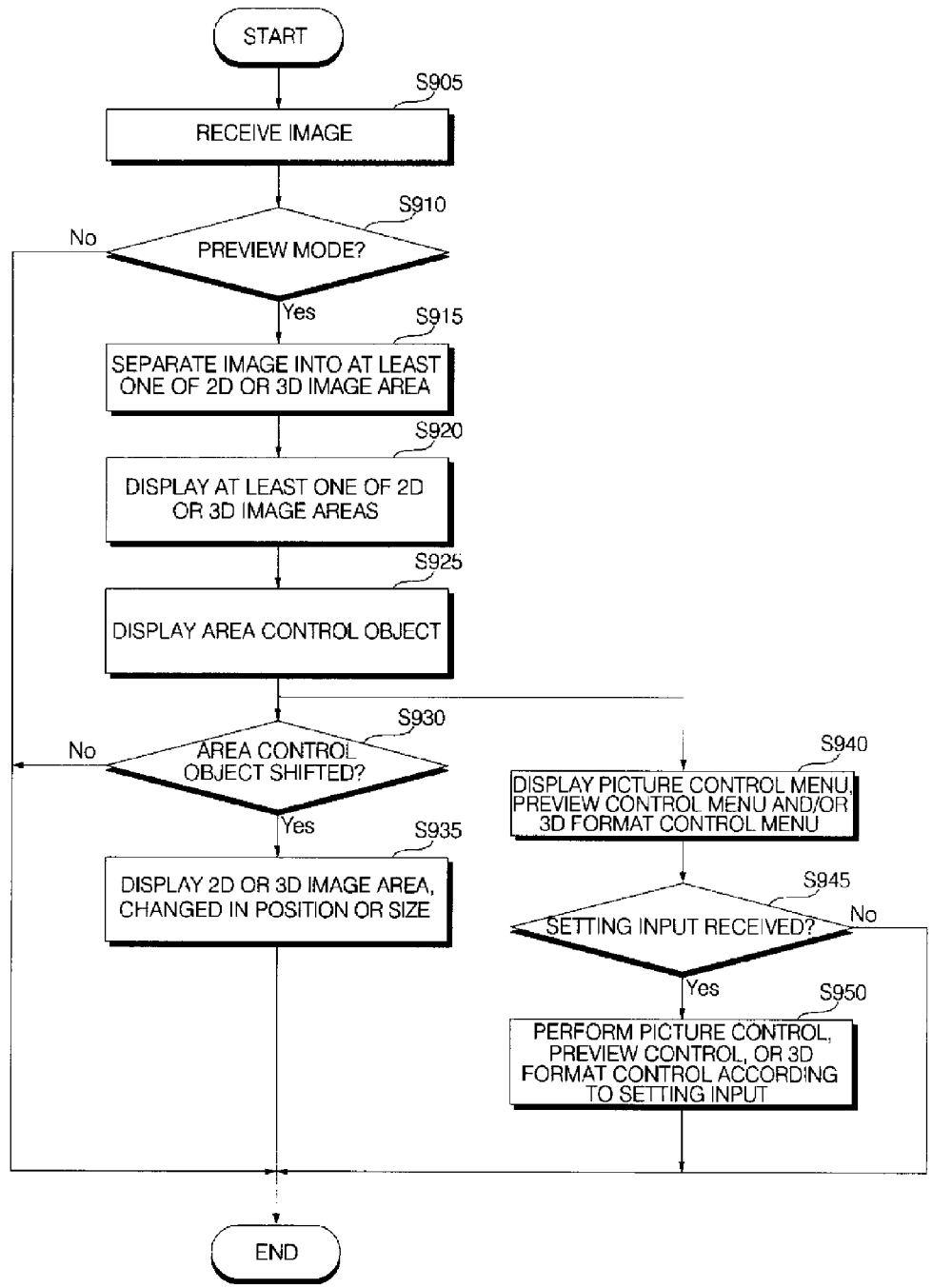
FIG. 9 is a flowchart illustrating a method for operating the image display apparatus according to an exemplary embodiment of the present invention.

FIG. 9 is a flowchart illustrating a method for operating the image display apparatus according to an exemplary embodiment of the present invention, and FIGS. 10 to 17 are views referred to for describing the method for operating the image display apparatus, illustrated in FIG. 9.

Referring to FIG. 9, an input image is received in step S905. The input image may be an external input image received from the external device 190, an image received from a content provider over a network, a broadcast image corresponding to a broadcast signal received from the tuner 110, or an image stored in the storage 140. The input image may be a 2D or 3D image.

In step S910, it is determined whether a preview mode has been set.

Specifically, the controller 170 may determine whether the preview mode has been set for the input image. The preview mode may be set according to a user input. If the image display apparatus 100 starts to receive an external input image from a connected external device, the preview mode may be automatically activated. Thus the user can easily view a preview image of the input image in the preview mode.

At least one of a 2D image area or a 3D image area is separated from the image in step S915.

Specifically, in the controller 170, the video processor 220 decodes the input image and the formatter 260 separates at least one of the 2D or 3D image areas from the decoded image.

The sizes of the separated 2D and 3D image areas may be equal to final 2D and 3D image area sizes used in a previous preview mode, or may be determined according to a user setting.

Figure 10:
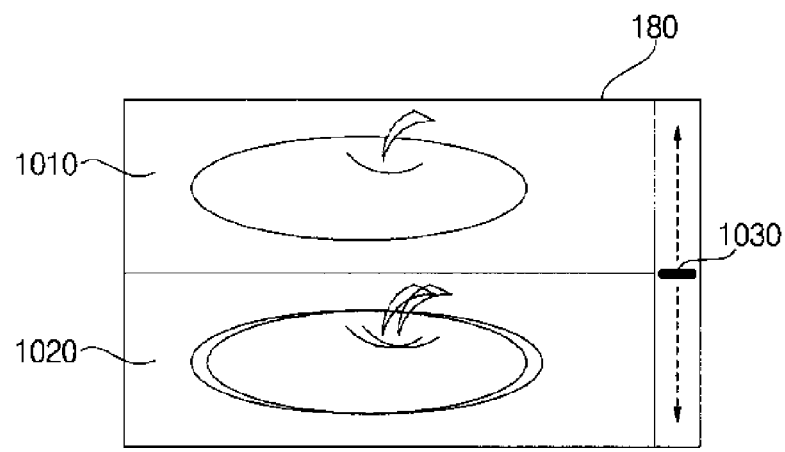
FIGS. 10 to 17 are views referred to for describing the method for operating the image display apparatus, illustrated in FIG. 9.

In FIG. 10, it is shown that the 2D image area and the 3D image area are identical in size, by way of example.

While it has been described that step S915 is performed when the preview mode has been set, to which the present invention is not limited, the input image may be separated into at least one of the 2D or 3D image areas, even though the preview mode has not been set.

The at least one image area separated from the input image, that is, at least one of the 2D or 3D image areas is displayed on the display in step S920 and an area control object is displayed on the display 18 to allow the user to change the positions or sizes of the 2D and 3D image areas in step S925.

The controller 170, particularly the formatter 260 processes the separated 2D and 3D image areas by 2D signal processing and 3D signal processing, respectively, and controls the processed 2D and 3D image areas to be displayed on the display 180.

The OSD generator 240 generates the area control object for changing the positions or sizes of the 2D and 3D image areas and outputs the area control object to the formatter 260. Then the formatter 260 may control the display 180 to display the area control object after processing the area control object.

In the illustrated case of FIG. 10, a 2D image area 1010 and a 3D image area 1020 are displayed in the same size in the top/bottom format. A scroll bar 1030 may be displayed as the area control object for changing the positions or sizes of the 2D and 3D image areas 1010 and 1020, on a right part of the display 180.

Therefore, the user can move the scroll bar 1030 by a directional key input of the remote controller 200 or a pointer indicating the position of the remote controller 200.

Figure 11:
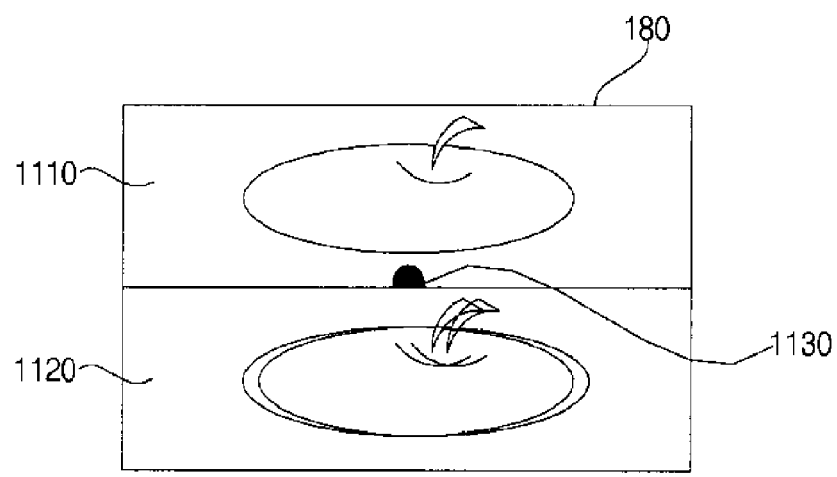

FIG. 11 illustrates another exemplary area control object different from the area control object illustrated in FIG. 10. Referring to FIG. 11, with 2D and 3D image areas 1110 and 1120 displayed in the same size in the top/bottom format, a window control object 1130 may be displayed as an area control object on the boundary between the 2D and 3D image areas 1110 and 1120.

Thus the user can move the window control object 1130 by a directional key input of the remote controller 200 or the pointer indicating the position of the remote controller 200.

In step S930, it is determined whether an area control object shift input has been received. Upon receipt of the area control object shift input, the 2D or 3D image area is changed in position or size according to the area control object shift input in step S935.

The controller 170 may determine whether the area control object shift input has been received, from a user input signal received through the user input interface 150.

When the area control object shift input has been received, the controller 170 may control the display 180 such that the 2D or 3D image area is displayed, changed in position or size.

Specifically, the video processor 220 or the OSD generator 240 may provide information about the changed position or size of the 2D or 3D image area to the formatter 260 in the controller 170. Then the formatter 260 may process the 2D or 3D image area according to the changed position or size during 2D or 3D signal processing. Alternatively, the formatter 260 may determine the changed position or size of the 2D or 3D image area and process the 2D or 3D image area according to the determined position or size during 2D or 3D signal processing.

FIGS. 13A, 13B and 13C illustrate images in the case where an area control object moves upward. Referring to FIG. 13A, a 2D image area 1310 and a 3D image area 1320 are displayed in the same size in the top/bottom format, while an area control object 1330 is displayed on a right part of the display 180. In this state, if the area control object 130 moves upward, the sizes of the 2D image area 1310 and the 3D image area 1320 may be changed so as to result in a 2D image area 1315 or 1317 and a 3D image area 1325 or 1327, as illustrated in FIGS. 13B and 13C.

Referring to FIG. 13B, the 2D and 3D image areas 1310 and 1320 illustrated in FIG. 13A are processed in the bypass mode so that they are changed only in size, without scaling. Therefore, the resulting 2D and 3D image areas 1315 and 1325 have parts of the original 2D and 3D image areas 1310 and 1320, respectively. Thus the user can compare the 2D view with the 3D view intuitively.

Referring to FIG. 13C, the 2D and 3D image areas 1310 and 1320 illustrated in FIG. 13A are processed in the scaling mode so that they are changed in size and also scaled according to their changed sizes. Therefore, the resulting 2D and 3D image areas 1317 and 1327 include the scaled 2D and 3D image areas 1310 and 1320, respectively. Thus the user can compare the 2D view with the 3D view intuitively.

In FIGS. 13A, 13B and 13C, besides the area control object 1330, a menu area 1340 including a picture control menu for setting image quality and a preview control menu for setting scaling or non-scaling, and a menu area 1350 including a 3D format control menu for setting a 3D format are further displayed on the display 180, which will be described later with reference to step S940.

FIGS. 14A, 14B and 14C illustrate an exemplary operation for adding or deleting a particular menu by shifting a menu area 1440 or 1450 along with an area control object 1430, upon receipt of an area control object shift input, which will also be described later with reference to step S940.

FIGS. 15A and 15B illustrate an exemplary operation for displaying only a 3D image area 1520 fully, when an area control object 1530 reaches almost a top edge of the display 180.

Referring to FIG. 15A, a 2D image area 1510 and the 3D image area 1520 are displayed in the same size in the top/bottom format and the area control object 1530 is displayed on a right part of the display 180. In this state, if the area control object 1530 moves up near the top edge of the display 180, the 3D image area 1520 may be changed to a full 3D image area 1525, with the 2D image area 1510 removed from the display 180, as illustrated in FIG. 15B.

FIGS. 16A and 16B illustrate an exemplary operation for displaying only a 2D image area 1610 fully, when an area control object 1630 moves down almost to a bottom edge of the display 180.

Referring to FIG. 16A, the 2D image area 1610 and a 3D image area 1620 are displayed in the same size in the top/bottom format and the area control object 1630 is displayed on a right part of the display 180. In this state, if the area control object 1630 moves down near the bottom edge of the display 180, the 2D image area 1610 may be changed to a full 2D image area 1615, with the 3D image area 1620 removed from the display 180, as illustrated in FIG. 16B.

In step S940, the picture control menu, the preview control menu, and/or the 3D format control menu may be displayed after step S925.

In the controller 170, the OSD generator 240 may generate the picture control menu, the preview control menu, and/or the 3D format control menu and the formatter 260 may process the generated menu by 2D signal processing and display the 2D-processed menu on the display 180. Therefore, the user can set an intended image quality, scaling or non-scaling, a 3D format, or a depth, easily.

Figure 12:
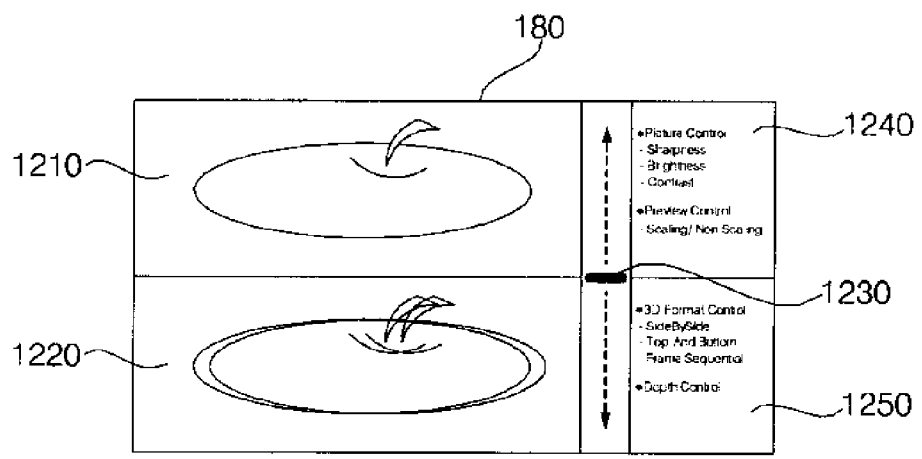
Figure 13:
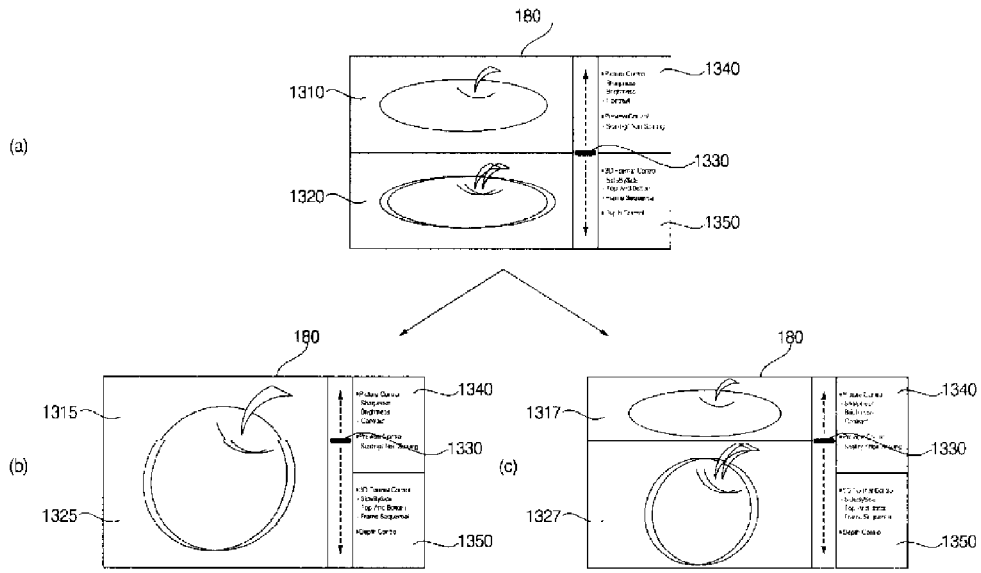
Figure 14:
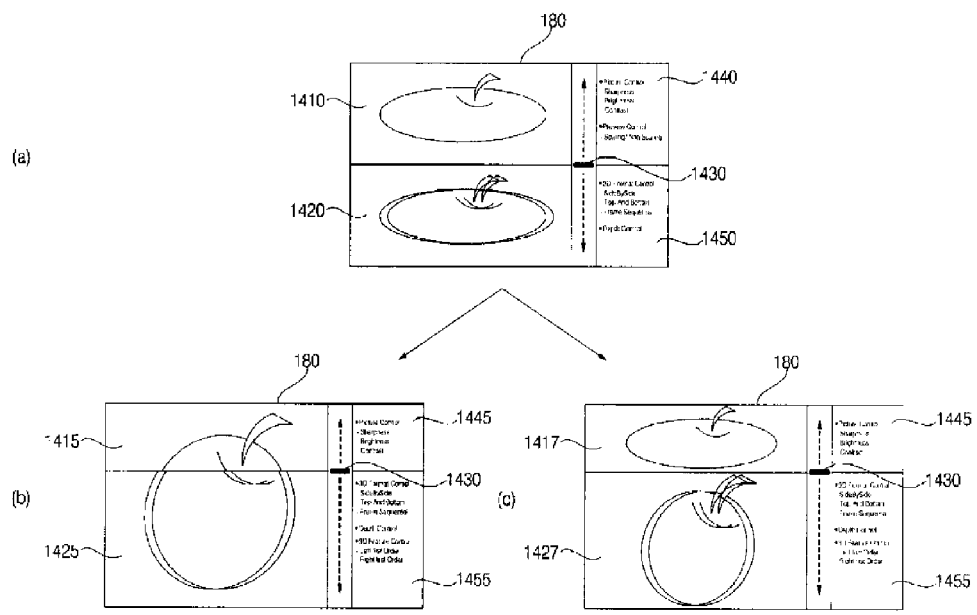
Figure 15:
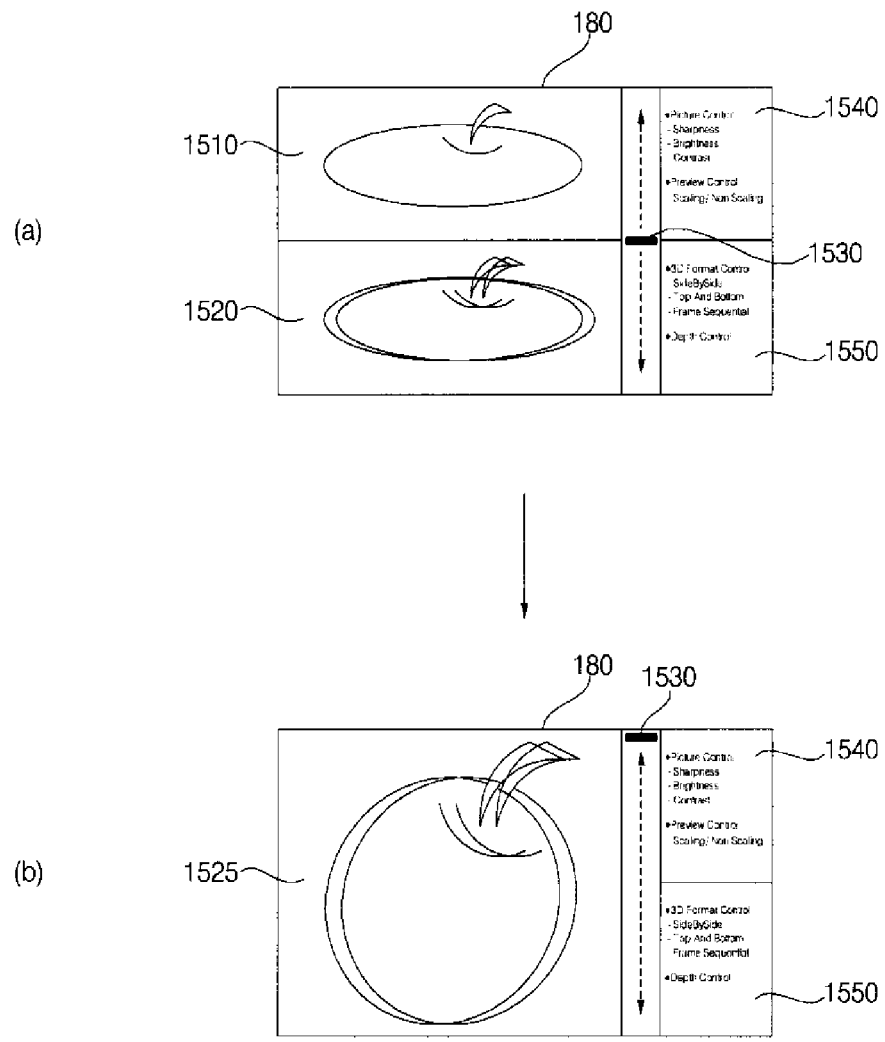
Figure 16:
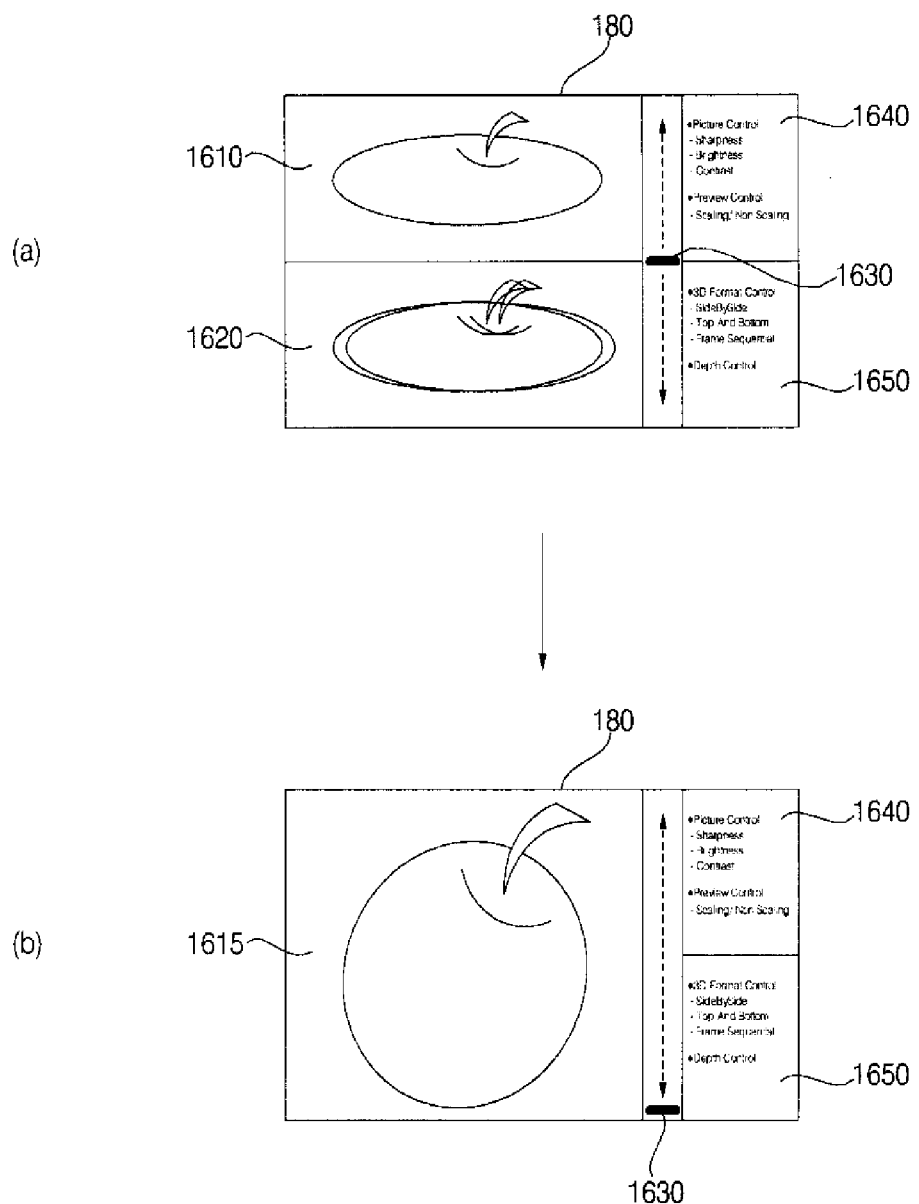
Figure 17:
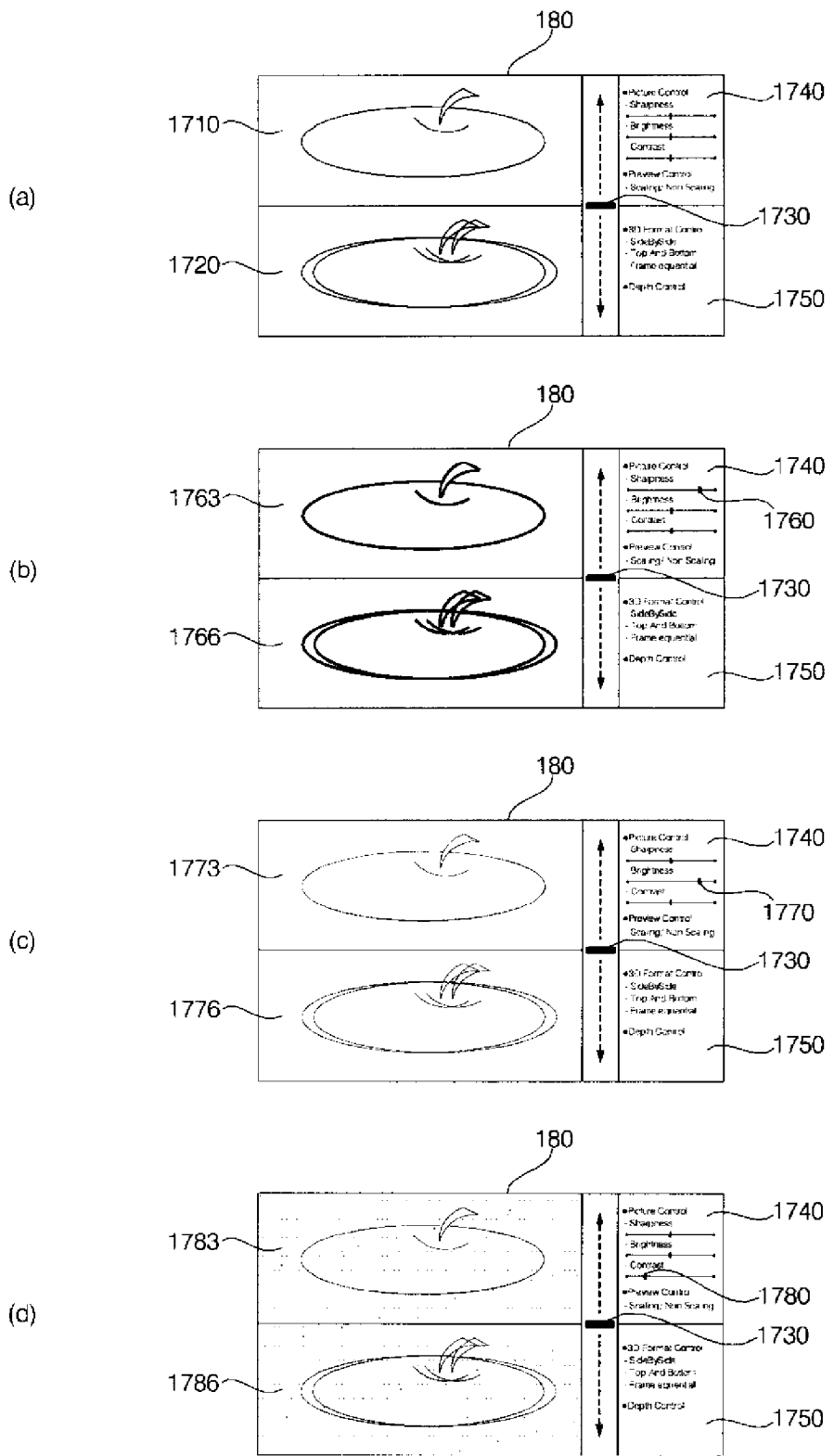

Referring to FIG. 12, a menu area 1240 including a picture control menu and a preview control menu is displayed on the right of a 2D image area 1210, while a menu area 1250 including a depth control menu and a 3D format control menu for setting the side-by-side menu, the top/bottom menu, the frame sequential menu, etc. is displayed on the right of a 3D image area 1220.

Referring to FIG. 13A similar to FIG. 12, the menu area 1340 including the picture control menu and the preview control menu is displayed on the right of the 2D image area 1310, while another menu area 1350 including the 3D format control menu for setting the side-by-side format, the top/bottom menu, the frame sequential menu, etc. and the depth control menu is displayed on the right of the 3D image area 1320.

In FIG. 13B or 13C, the menu areas 1340 and 1350 are fixed irrespective of the movement of the area control object 1330, whereas in FIG. 14B or 14C, the movement of the area control object 1430 leads to a change in a menu area.

Along with the movement of the area control object 1430, a menu is added to or deleted from menu areas 1440 and 1450 illustrated in FIG. 14A, thus creating menu areas 1445 and 1455, as illustrated in FIGS. 14B and 14C.

Referring to FIG. 14B, as the area control object 1430 moves upward, the menu area 1445 obtained by deleting the preview control menu from the menu area 1440 of FIG. 14A is displayed on the right of the 2D image area 1415, and the menu area 1455 obtained by adding 3D feature control menu to the existing 3D format control menu and depth control menu of the menu area 1450 of FIG. 14A is displayed on the right of the 3D image area 1425. For example, the 3D feature control menu may include the menu for setting the left first order, the right first order.

When the area control object 1430 moves downward, the menu areas 1440 and 1450 may be changed reversely to the above example illustrated in FIG. 14B or 14C such that a menu is added to the menu area 1440 and a menu is deleted from the menu area 1450.

With the menus displayed on the display 180, it is determined whether a particular setting input has been received in step S945 and a picture control, a preview control or a 3D format control may be performed according to the particular setting input in step S950.

The controller 170 may perform a picture control, a preview control or a 3D format control according to a user input and thus may control the display 180 to display a picture-controlled, preview-controlled or 3D format-controlled screen.

FIGS. 17A to 17D illustrate exemplary image quality settings by the picture control menu.

Referring to FIG. 17A, while a 2D image area 1710 and a 3D image area 1720 are displayed in the same size in the top/bottom format and an area control object 1730 is displayed on a right part of the display 180, a menu area 1740 including the picture control menu and the preview control menu may be displayed on the right of the 2D image area 1710 and a menu area 1750 including the 3D format control menu and the depth control menu may be displayed on the right of the 3D image area 1720.

At least one of sharpness, brightness or contrast may be changed in the picture control menu using a directional key input of the remote controller 200 or the pointer corresponding to the movement of the remote controller 200.

FIG. 17B illustrates 2D and 3D image areas 1763 and 1766 with a sharpness that has been increased by shifting an object 1760 indicating sharpness to the right in the picture control menu.

FIG. 17C illustrates 2D and 3D image areas 1773 and 1776 with a brightness that has been increased by shifting an object 1770 indicating brightness to the right in the picture control menu.

FIG. 17D illustrates 2D and 3D image areas 1783 and 1786 with a contrast that has been decreased by shifting an object 1780 indicating contrast to the left in the picture control menu.

As described above, when the user adjusts a menu item in the picture control menu, he or she can view 2D and 3D image areas immediately with an image quality changed according to the menu item. Thus user convenience is increased.

While not shown in FIGS. 17A to 17D, if scaling is selected in the preview control menu, the afore-described scaling mode may be set. On the contrary, if non-scaling is selected in the preview control menu, the afore-described bypass mode may be set.

While not shown in FIGS. 17A to 17D, one of the side-by-side format, the top/bottom menu, and the frame sequential menu may be set using the 3D format control menu.

While not shown in FIGS. 17A to 17D, a depth level may be increased or decreased using the depth control menu such that a 3D image appears more protruding or less protruding.

In this manner, various settings are facilitated during 3D image viewing, thereby increasing user convenience.

The image display apparatus and the method for operating the same according to the foregoing exemplary embodiments are not restricted to the exemplary embodiments set forth herein. Therefore, variations and combinations of the exemplary embodiments set forth herein may fall within the scope of the present invention.

The method for operating an image display apparatus according to the foregoing exemplary embodiments may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for operating an image display apparatus, the method comprising:
   receiving an image;
   creating a two-dimensional (2D) image and a three-dimensional (3D) image from the received image;
   separating a display into a 2D image area and a 3D image area;
   displaying the 2D image in the 2D image area and the 3D image in the 3D image area simultaneously;

displaying an area control object on the display simultaneously with the 2D image and 3D image, the area control object receiving an input for changing a position or size of the 2D image area and 3D image area on the display;

changing, upon receipt of a shift input of the area control object, the position or size of the 2D or 3D image area according to the area control object shift input; and displaying the changed 2D or 3D image area on the display, wherein the changing and displaying comprises changing sizes of the 2D and 3D image areas according to the area control object shift input, scaling the 2D and 3D image areas according to the changed sizes, and displaying the scaled 2D and 3D images, in a scaling mode.

2. The method according to claim 1, wherein the changing and displaying comprises changing sizes of the 2D and 3D image areas according to the area control object shift input and displaying the changed 2D and 3D images, without scaling the 2D and 3D images, in a bypass mode.

3. The method according to claim 1, further comprising displaying at least one of a picture control menu for setting image quality, a preview control menu for setting scaling or non-scaling, or a 3D format control menu for setting a 3D format on the display.

4. The method according to claim 3, further comprising performing, upon receipt of a setting input, a picture control, a preview control, or a 3D format control according to the setting input.

5. The method according to claim 3, further comprising, upon receipt of the area control object shift input, deleting a menu from or adding a menu to the at least one displayed menu according to the area control object shift input.

6. The method according to claim 3, further comprising changing, upon receipt of a picture control menu setting input, at least one of sharpness, brightness, or contrast of the at least one displayed image area according to the picture control menu setting input and displaying the at least one displayed image area with the changed at least one of sharpness, brightness or contrast.

7. The method according to claim wherein the separation and the area control object displaying are performed, if a preview mode is set.

8. An image display apparatus comprising:
a controller configured to:
receive an input image; and
create a two-dimensional (2D) image area and three-dimensional (3D) image from the received image;
a display separated into a 2D image area and a 3D image area;
an area control object displayed on the display simultaneously with the 2D image and 3D image, the area control object receiving an input for changing a position or size of the 2D image area and 3D image area on the display;
a user input interface to provide a user input to the controller, and the controller further configured to:
display the 2D mage in the 2D image area and the 3D image in the 3D image area;
wherein if the user input is an area control object shift input, the display displays the 2D or 3D image area changed in position or size according to the area control object shift input,
wherein the display displays the 2D and 3D image areas, changed in size and scaled according to the changed sizes, and displaying the scaled 2D and 3D images, in a scaling mode.

9. The image display apparatus according to claim 8, wherein the controller includes:
a video processor to decode the input image; and
a formatter to separate the decoded image into the at least one of the 2D or 3D image areas, process the 2D image area by 2D signal processing, and
process the 3D image area by 3D signal processing.

10. The image display apparatus according to claim 8, wherein the displays the 2D and 3D image areas, changed in size but not scaled, in a bypass mode.

11. The image display apparatus according to claim 8, wherein the display further displays at least one of a picture control menu, a preview control menu, or a 3D format control menu.

12. The image display apparatus according to claim 8, further comprising a user input interface to provide a user input to the controller,
wherein if the user input is an area control object shift input, the display displays the at least one displayed menu with a menu deleted from or added to the at least one displayed menu according to the area control object shift input.

13. The image display apparatus according to claim 8, further comprising a user input interface to provide a user input to the controller,
wherein if the user input is a picture control menu setting input, the display displays the at least one displayed image area, changed in at least one of sharpness, brightness or contrast according to the picture control menu setting input.

14. The method according to claim 1, wherein the area control object is moved on the display to change the position or size of the 2D image area and 3D image area on the display.

15. The image display apparatus according to claim 8, wherein the area control object is moved on the display to change the position or size of the 2D image area and 3D image area on the display.

* * * * *